(12) United States Patent
McMasters

(10) Patent No.: US 8,590,321 B2
(45) Date of Patent: Nov. 26, 2013

(54) VACUUM PUMP OIL CHANGING METHOD AND APPARATUS

(75) Inventor: Mark McMasters, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 417 days.

(21) Appl. No.: 12/898,299

(22) Filed: Oct. 5, 2010

(65) Prior Publication Data

US 2012/0079839 A1    Apr. 5, 2012

(51) Int. Cl.
*F25B 45/00* (2006.01)

(52) U.S. Cl.
USPC ................................. 62/77; 62/149

(58) Field of Classification Search
USPC ........ 62/77, 84, 468, 474, 475, 149; 137/172, 137/192; 417/313; 418/97
See application file for complete search history.

(56) References Cited

U.S. PATENT DOCUMENTS

| 4,285,206 | A | * | 8/1981 | Koser | 62/126 |
|---|---|---|---|---|---|
| 4,364,236 | A | * | 12/1982 | Lower et al. | 62/77 |
| 4,441,330 | A | * | 4/1984 | Lower et al. | 62/149 |
| 4,676,265 | A | * | 6/1987 | Volk | 137/172 |
| 4,688,388 | A | | 8/1987 | Lower et al. | |
| 4,755,957 | A | * | 7/1988 | White et al. | 702/184 |
| RE33,212 | E | * | 5/1990 | Lower et al. | 62/126 |
| 5,033,271 | A | * | 7/1991 | Manz et al. | 62/125 |
| 5,172,562 | A | * | 12/1992 | Manz et al. | 62/149 |
| 5,287,589 | A | * | 2/1994 | Hughes | 15/321 |
| 5,325,675 | A | * | 7/1994 | Manz et al. | 62/77 |
| 5,560,215 | A | | 10/1996 | Talarico | |
| 5,606,862 | A | * | 3/1997 | Peckjian et al. | 62/77 |
| 5,758,506 | A | * | 6/1998 | Hancock et al. | 62/77 |
| 6,185,945 | B1 | * | 2/2001 | Pfefferle et al. | 62/149 |
| 6,206,055 | B1 | * | 3/2001 | Hollub et al. | 141/98 |
| 6,217,328 | B1 | * | 4/2001 | Oliver | 433/80 |
| 6,314,749 | B1 | * | 11/2001 | Van Steenburgh, Jr. | 62/292 |
| 6,585,492 | B2 | * | 7/2003 | Muhs et al. | 417/68 |
| 6,619,065 | B1 | * | 9/2003 | Burton et al. | 62/292 |
| 7,097,435 | B2 | * | 8/2006 | Erisgen et al. | 417/434 |
| 7,937,957 | B2 | | 5/2011 | McMasters | |
| 7,975,500 | B2 | * | 7/2011 | Colnaghi et al. | 62/292 |
| 2005/0039470 | A1 | * | 2/2005 | Laing et al. | 62/129 |
| 2009/0188271 | A1 | | 7/2009 | McMasters et al. | |
| 2010/0183467 | A1 | | 7/2010 | Sundheim | |

FOREIGN PATENT DOCUMENTS

JP    62-023594 A    1/1987

OTHER PUBLICATIONS

European Search Report issued on Sep. 20, 2012 for European Application No. 11179696.7 filed Sep. 1, 2011.

* cited by examiner

*Primary Examiner* — Mohammad M Ali
(74) *Attorney, Agent, or Firm* — Baker & Hostetler LLP

(57) ABSTRACT

Refrigerant processing equipment is provided. The refrigerant processing equipment may include: a vacuum pump; an outlet for draining vacuum pump lubricating oil from the vacuum pump; a fluid container; and a conduit configured to provide a fluid connection between the outlet and the container. A method for draining oil from a vacuum pump from refrigerant processing equipment is provided. The method may include connecting an outlet for oil on the vacuum pump with a container; and providing a valve between the outlet and the container to selectively provide fluid communication between the outlet and an the container.

16 Claims, 6 Drawing Sheets

VACUUM PUMP OIL CHANGING METHOD AND APPARATUS

FIELD OF THE INVENTION

The disclosure generally relates to equipment for servicing automotive vehicle air conditioning systems, and more particularly to clearing oil from a vacuum pump in a refrigerant recovery unit used to service a vehicle.

BACKGROUND OF THE INVENTION

Portable refrigerant recovery units or carts are used in connection with the service and maintenance of refrigeration systems including an automotive vehicle's air conditioning system. The refrigerant recovery unit connects to the air conditioning system of the automotive vehicle to recover refrigerant out of the system, separate out oil and contaminants, and recharge the system with additional refrigerant.

An oil inject portion of the refrigerant recovery unit is used to put the same amount of compressor oil back into the air conditioning system as was taken out during the recovery process. This may be a visual determination by reading a graduation on the oil drain bottle and on the oil inject bottle, or it may be an automated process.

The oil required in the air conditioning system of a conventional automotive vehicle typically differs from the oil required in a hybrid vehicle. Conventional automotive air conditioning systems typically use polyalkylene glycol lubricant ("PAG") oil as the refrigerant lubricant or compressor oil, whereas many hybrid vehicle systems use polyester ("POE") oil. These oils are generally not compatible with each other. Thus, there is a need to ensure that these various types of oil do not mix with each other between recovery processes.

Portable refrigerant recovery units or carts used in connection with the service and maintenance of refrigeration systems often have vacuum pumps to create a vacuum in order to draw refrigerant from a vehicle's air conditioning system. The vacuum pump itself may be lubricated with lubricating oil. The lubricating oil may need to be changed from time to time.

Common vacuum pumps have an oil drain plug that is removed in order to drain the vacuum pump oil. Then the person performing the oil change locates a container to drain the oil into. On some pieces of air conditioning servicing equipment, there is no place to set the container so a person must hold the container while the oil is draining. Having a person hold the oil container can lead to spills related to human err and require the time of the holder. A system that automates the oil draining process may be desired.

SUMMARY OF THE INVENTION

In accordance with one embodiment of the present invention refrigerant processing equipment is provided. The refrigerant processing equipment may include: a vacuum pump; an outlet for draining vacuum pump lubricating oil from the vacuum pump; a fluid container; and a conduit configured to provide a fluid connection between the outlet and the container. A method for draining oil from a vacuum pump from refrigerant processing equipment is provided.

In accordance with another embodiment of the invention, refrigerant processing equipment may be provided. The refrigerant processing equipment may include: means for creating a vacuum; means for outletting a means for lubricating the means for creating a vacuum; means for storing a fluid; and means for transmitting a fluid configured to provide a fluid connection between the outletting means and the means for storing a fluid.

In accordance with yet another embodiment of the present invention, a method for draining oil from a vacuum pump from refrigerant processing equipment is provided. The method may include connecting an outlet for oil on the vacuum pump with a container; and providing a valve between the outlet and the container to selectively provide fluid communication between the outlet and an the container.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
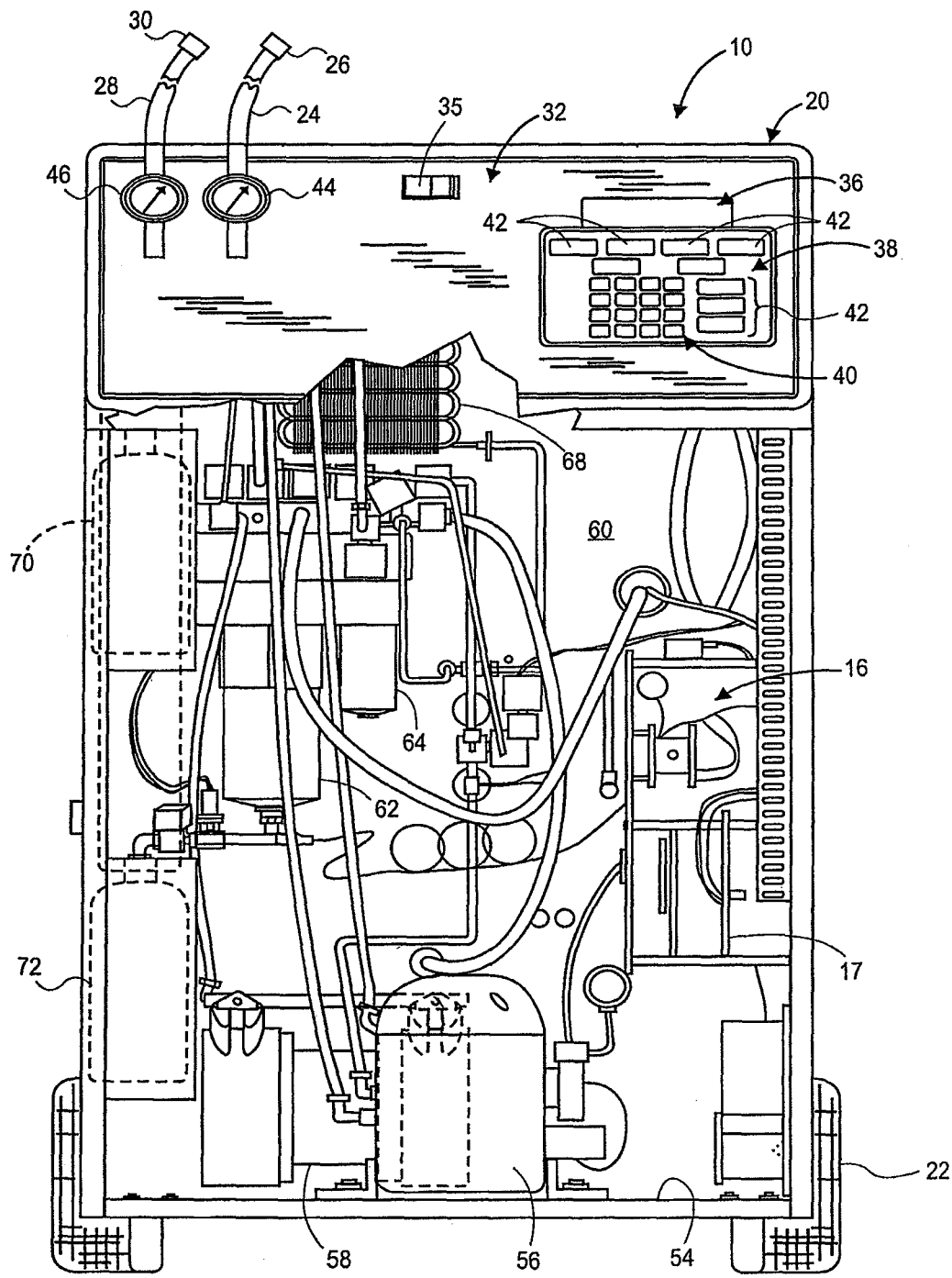
FIG. 1 is a fragmentary front plan view of an example refrigerant recovery unit shown with a portion of the front cover removed.

The invention will now be described with reference to the drawing figures, in which like numerals refer to like parts throughout. Some embodiments of the invention may be used on equipment similar to the equipments shown and described in U.S. patent application Ser. No. 12/254,202 filed Oct. 20, 2008, titled Method and Apparatus for Clearing Oil Inject Circuit For Changing Oil Types and incorporated herein in its entirety by reference.

Figure 2:
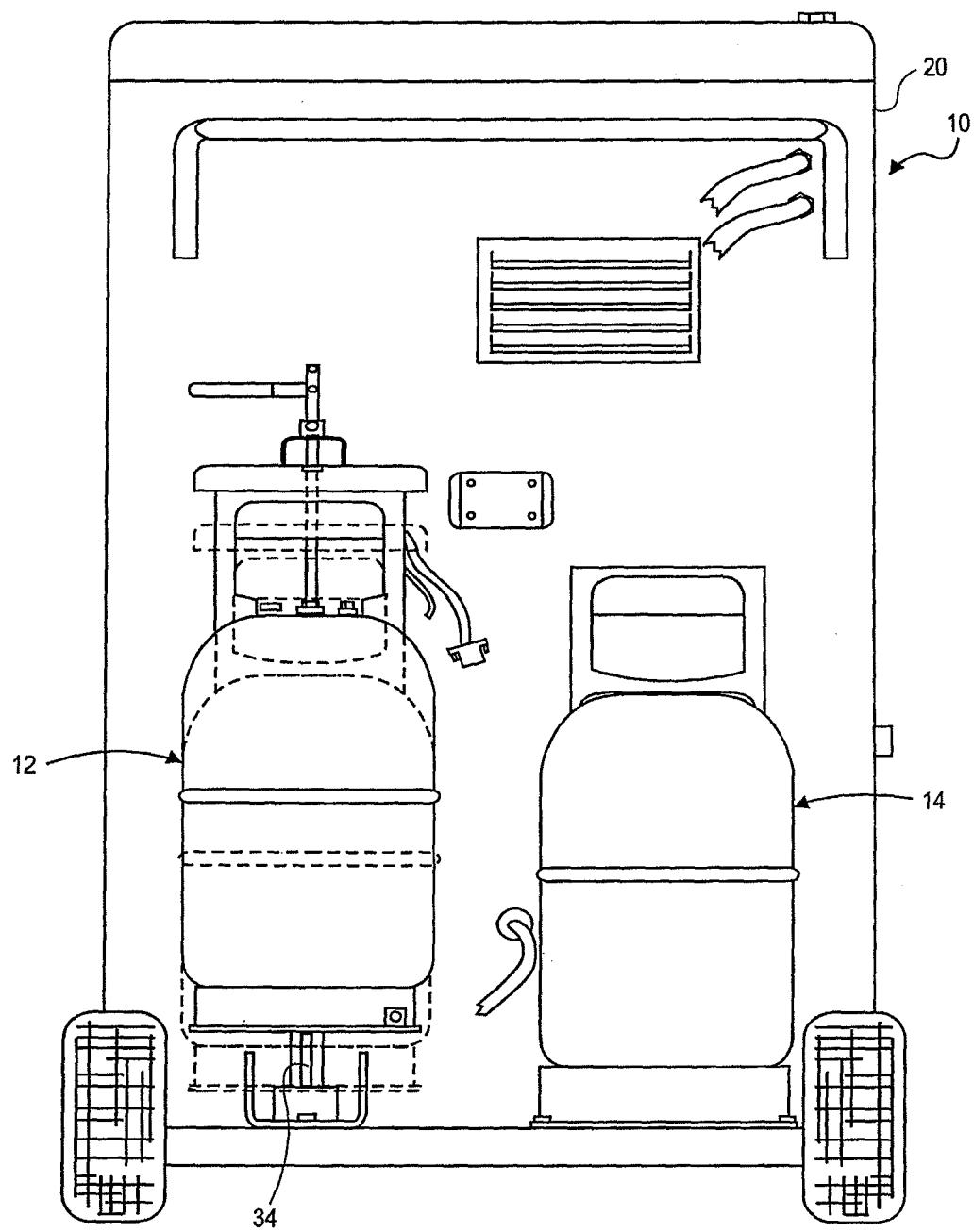
FIG. 2 is a fragmentary rear plan view of the refrigerant recovery unit shown in FIG. 1 according to an embodiment of the invention.

FIGS. 1 and 2 show an example of a portable refrigerant recovery unit 10 constructed according to principles of the invention, for recovering and recycling refrigerant from a refrigerant system, such as in an automotive vehicle. The recovery unit 10 includes a flushable oil inject circuit for removing traces of one kind of oil so that the unit 10 may service the another vehicle utilizing a different kind of oil. The refrigerant recovery unit 10 is a machine having a cabinet 20 supported by a pair of wheels 22, for portability. The unit 10 includes a first container or main tank 12 for holding a primary supply of refrigerant. The main tank 12 may also be referred to as an internal storage vessel (ISV). The primary supply of refrigerant or recovered refrigerant contains refrigerant that has been recovered from the air conditioning system. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged to be in fluid communication with the main tank 12 so that fresh refrigerant can be transferred from the auxiliary tank 14 to the main tank 12 as needed.

Figure 3:
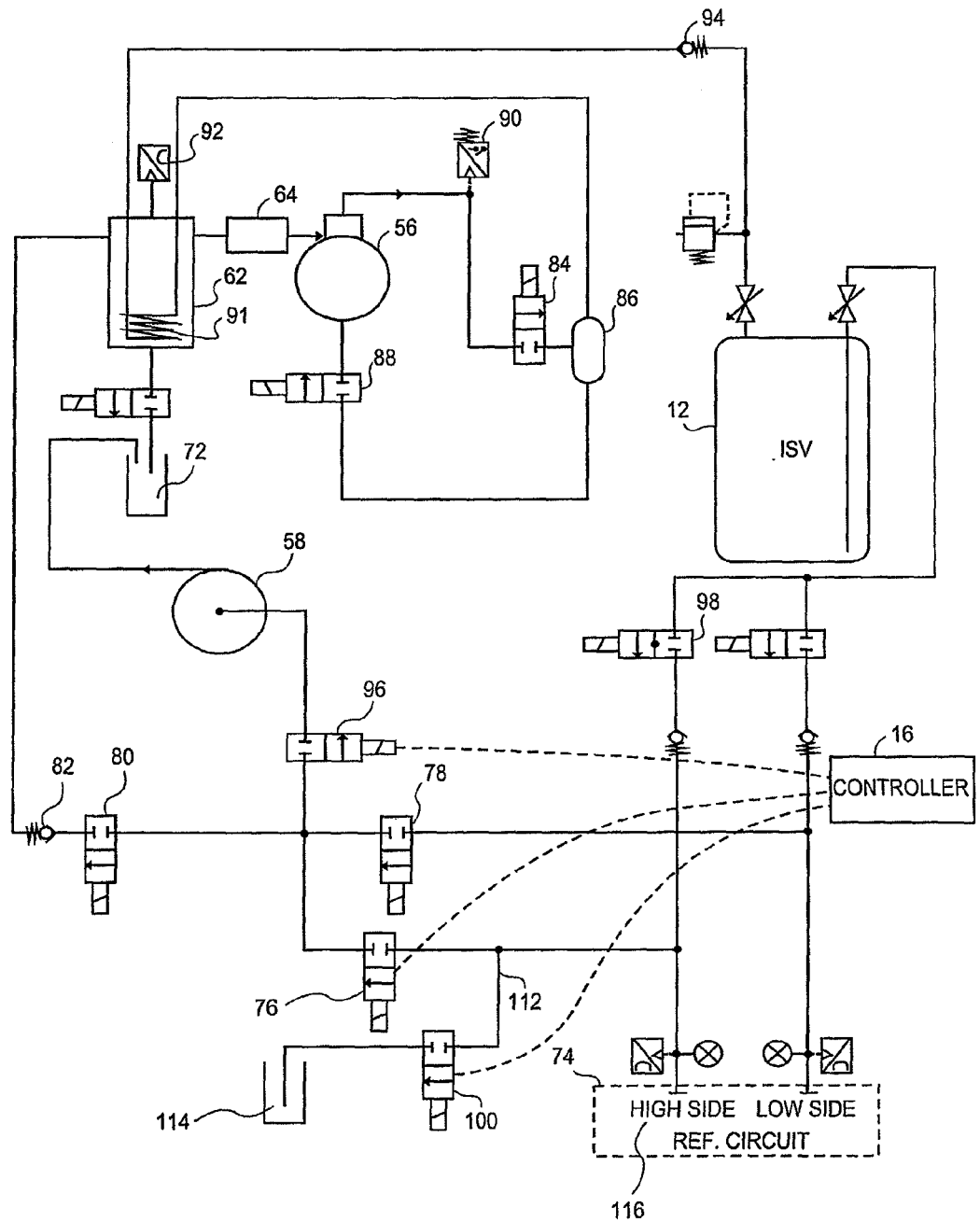
FIG. 3 is an example of a flow diagram of the refrigerant recovery unit shown in FIGS. 1 and 2.

An electronic controller 16 includes a microprocessor on a circuit board 17. The electronic controller 16 controls the transfer of refrigerant from the auxiliary tank 14 to the main tank 12 and between the main tank 12 and a refrigeration system 74 (FIG. 3). The controller 16 also controls electromechanical solenoid valves, including solenoid valves 76, 96, 100 (FIG. 3). Although only three solenoid valves are shown connected to the controller, in some embodiments each of the solenoid valves may be connected to the controller. The controller 16 may include a memory unit to store software and data, and the microprocessor may be coupled to the memory unit for executing the software stored in the memory unit. The electronic controller 16 receives data signals from a variety of devices and sensors, including pressure sensors, temperature sensors, control switches (on the control panel 32), and a weighing device 34.

The weighing device 34 shown in the example embodiment is a load cell, but the weighing device may also be any type of electronic scale or any other type of weighing device configurable to transmit a weight data signal to the controller 16. As shown in FIG. 2, the main tank 12 rests on the weighing device 34. The weighing device 34 provides a weight data signal to the controller 16 such that the weight of the tank comprising its tare weight plus the weight of refrigerant therein is monitored by the controller 16.

The control panel 32 includes an on/off switch 35 and a display 36 for displaying the operational status of the refrigerant recovery unit's operation. The display may be an LCD display or other suitable electronic display that is coupled to the controller 16 by way of a conventional input/output circuit. The control panel 32 further includes a switch panel 38 having a conventional keyboard 40, and a plurality of push-button switches 42 for controlling the operation of the unit 10 through its various phases of operation and/or for selecting parameters for display. The keyboard 40 in conjunction with operational switches 42 and display 36 allow an operator to enter the desired operational parameters for the unit 10 according to manufacturer specifications for the servicing of an air conditioning system in a particular vehicle.

The refrigerant recovery unit 10 includes a high pressure hose 24, typically color coded red, with a coupling 26 for coupling to the high pressure port of an automotive vehicle refrigeration system and a low pressure hose 28, typically color coded blue, having a coupling 30 for coupling to the low pressure port. In some refrigerant systems, there may be only one port, for example, where the recovery or low pressure port is eliminated. In such systems, the refrigerant recovery unit may be configured with one hose, in accordance with the principles of the invention.

The front panel of the cabinet 20 is shown broken away in FIG. 1 to show the major elements of the refrigerant recovery unit 10. The input hoses 24 and 28 are coupled to pressure gauges 44 and 46, respectively, which are mounted on the front panel of refrigerant recovery unit 10, as seen in FIG. 1. In addition, electrical pressure transducers (not shown) may be coupled to the hoses 24 and 28, and to the controller 16 through conventional input/output circuits to provide the controller 16 with pressure information during operation of the unit 10. Gauges 44 and 46 provide the operator with a conventional analog or digital display of the pressure.

Mounted to the floor 54 of cabinet 20 is a fluid compressing means or compressor 56 and a vacuum pump 58. Behind the front of cabinet 20 on floor 54, is mounted the main tank 12 of refrigerant (FIG. 2) for the supply of refrigerant to the system being serviced. Also, mounted adjacent the main tank 12 is the auxiliary supply tank 14 which supplies additional refrigerant to the main tank 12. High pressure hoses and connectors together with control valves couple tank 14 to tank 12.

Mounted to the inside of rear wall 60 of cabinet 20 is an oil separator 62 and a compressor oil separator filter 64. In addition, a fresh oil canister 70 is mounted within a side compartment of cabinet 20. A recovery or waste oil container 72 is mounted on the lower part of the cabinet 20 to receive oil drained from the oil separator 62.

Figure 4:
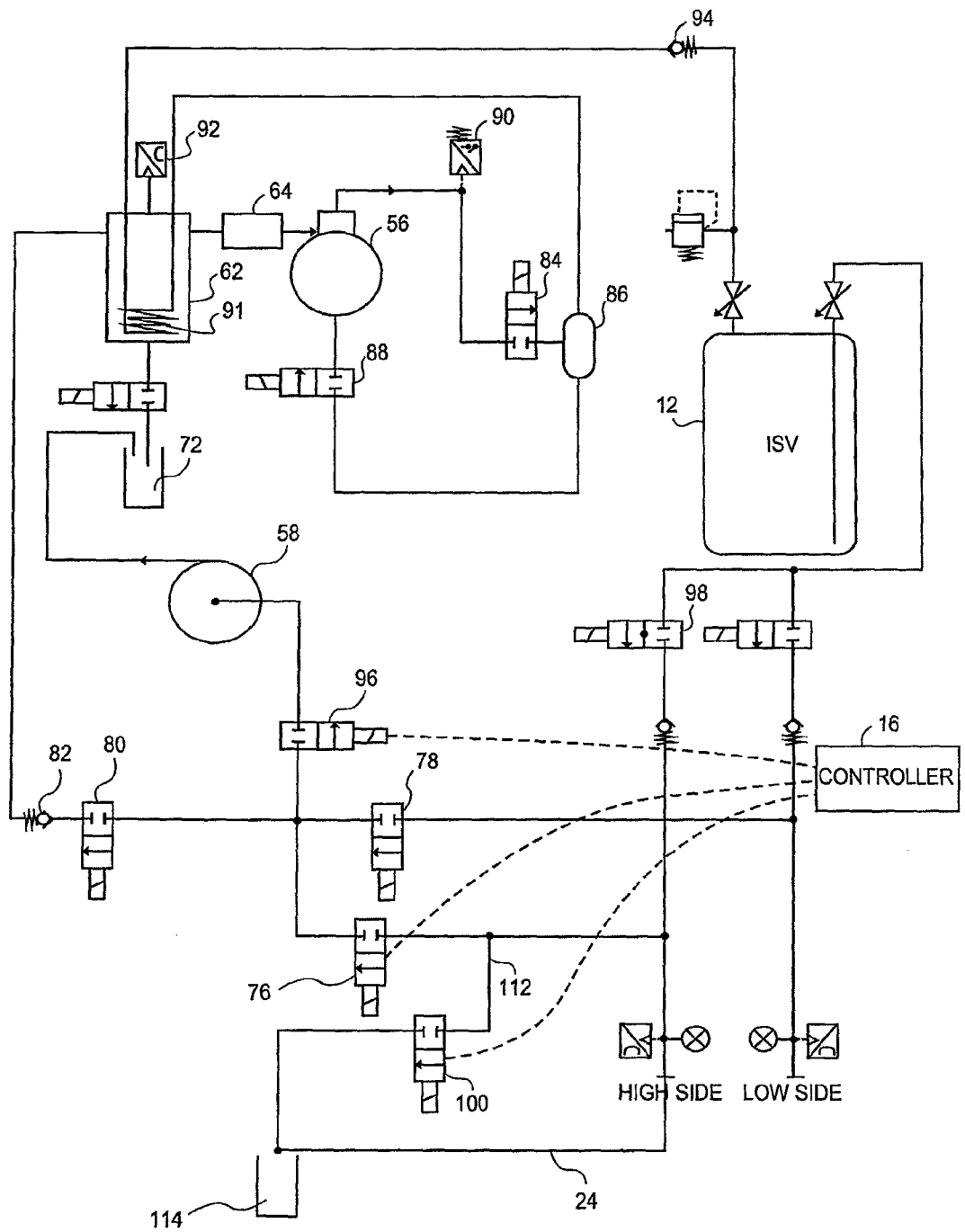
FIG. 4 is another example of a flow diagram of the refrigerant recovery unit shown in FIGS. 1 and 2.
Figure 5:
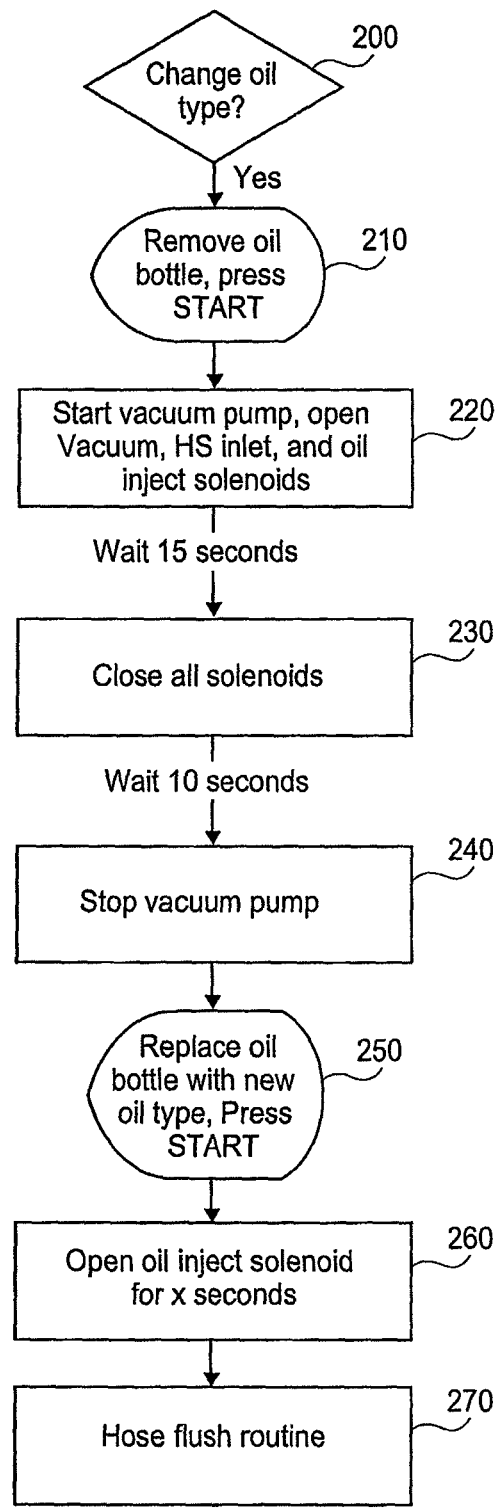
FIG. 5 is a flow chart illustrating operations that may be performed by the refrigerant recovery cart unit according to an embodiment of the invention.

Having briefly described the major components of the refrigerant recovery unit 10, a more detailed description of the structure and operation of the example refrigerant recovery unit 10 follows in connection with reference to FIGS. 3-5.

With respect to a recovery process, one example of a refrigerant recovery circuit is described below and shown in FIGS. 3-4. To recover refrigerant, initially, hoses 24 and 28 (FIG. 1) are coupled to the refrigeration system 74 of a vehicle, and the recovery cycle is initiated by the opening of high pressure and low pressure solenoids 76, 78, respectively. This allows the refrigerant within the refrigeration system 74 to flow through a recovery valve 80 and a check valve 82. The refrigerant flows from the check valve 82 into a system oil separator 62, where it travels through a filter/dryer 64, to an input of a compressor 56. Refrigerant is drawn through the compressor 56 through a normal discharge solenoid 84 and through the compressor oil separator 86, which circulates oil back to the compressor 56 through an oil return valve 88. The refrigerant recovery unit 10 includes a high pressure switch 90 in communication with the controller 16, which is programmed to determine an upper pressure limit, for example, 435 psi, to shut down the compressor 56 to protect the compressor 56 from excessive pressure, although this feature is optional. If a purging of the system is desired, a high-side clear solenoid (not shown) may optionally be coupled to the output of the compressor 56 to release the recovered refrigerant transferred from compressor 56 directly into the main tank 12, instead of through a path through the normal discharge solenoid 84.

The heated compressed refrigerant exits the oil separator 86 and then travels through a loop of conduit or heat exchanger 91 for cooling or condensing. As the heated refrigerant flows through the heat exchanger 91, it gives off heat to the cold refrigerant in the system oil separator 62, and assists in maintaining the temperature in the system oil separator 62 within a working range. Coupled to the system oil separator 62 is a switch or transducer 92, such as a low pressure switch or pressure transducer, for example, that senses pressure information, and provides an output signal to the microprocessor through a suitable interface circuit programmed to detect when the pressure has recovered the refrigerant down to 13 inches of mercury, for example. Finally, the recovered refrigerant flows through a normal discharge check valve 94 and into the main tank 12.

The evacuation cycle begins by the opening of high pressure and low pressure solenoids 76 and 78 and valve 96, leading to the input of a vacuum pump 58. Prior to opening valve 96, an air intake valve (not shown) is opened, allowing the vacuum pump 58 to start up exhausting air. The vehicle system 74 is then evacuated by the closing of the air intake valve and the opening of valve 96, allowing the vacuum pump 58 to exhaust any trace gases remaining until the pressure is approximately 29 inches of mercury, for example. When this occurs, as detected by pressure transducers optionally coupled to the high side and low side of the refrigeration system 74 and to the controller 16, the controller 16 actuates valve 96 by turning it off and beginning the recharging cycle.

The recharging cycle begins by opening charge valve 98 to allow the liquid refrigerant in tank 12, which is at a pressure of approximately 70 psi or above, to flow through the high side of the refrigeration system 74. The flow is through charge valve 98 for a period of time programmed to provide a full charge of refrigerant to the vehicle.

Having thus described the basic operations of the refrigerant recovery unit, the specific structure and operation of the refrigerant recovery unit 10 to clear oil or lubricant out of an oil inject path of the oil inject circuit will now be discussed with reference to FIGS. 3 and 4.

During the refrigerant recovery procedure, the refrigerant recovery unit 10 recovers refrigerant out of the refrigeration system 74, and separates out compressor oil and contaminants, and recharges the system with additional refrigerant. The compressor oil recovered out of the refrigeration system 74 lubricates the compressor and needs to be replaced back into the system 74.

In conventional automotive vehicle air conditioning systems, PAG oil is typically used as the refrigerant lubricant or compressor oil. Many hybrid systems with electric compressors use a different kind of oil, known as POE oil. The POE systems are sensitive to an electrical resistivity of the lubricant, because the lubricant contacts the electrical system. PAG oils typically have a lower resistivity than that of the POE oils, and this lower resistivity can create a potentially damaging leakage current. More particularly, for a given voltage, such as 300 volts which is approximately the operating voltage for a hybrid system, the lower resistivity translates into a high leakage current. Thus, if a certain percentage of the PAG\oil gets into the hybrid system, the lower resistivity of the PAG oil and the resulting leakage current can cause electrical problems in the hybrid system.

In order to facilitate a service operator to service a variety of vehicles one after the other with the same refrigerant recovery unit 10, an apparatus and method are developed to clear oil of one type out of the refrigerant recovery unit 10 and to prepare the unit 10 to switch over to a new type of oil so that a different vehicle requiring the new type of oil may be serviced with the same unit.

Coupled in fluid communication with the refrigerant recovery circuit is an oil inject means for adding oil into the system 74. One example of an oil inject means is the an oil inject circuit. More particularly, the oil inject circuit may be arranged in fluid communication with the vacuum pump 58 of the recovery circuit.

Referring to the example embodiment shown in FIG. 3, the oil inject circuit includes an oil inject valve 100 and an oil inject hose or line 112. The oil inject hose 112 is one example of a fluid transportation means for transmitting oil to the refrigerant recovery circuit of the refrigerant recovery unit 10. The oil inject hose 112 may be one length of hose or multiple lengths of hose or tubing or any other suitable means for transporting fluid. The oil inject hose 112 connects on one end to an oil inject bottle 114 and on the other end couples to the refrigerant recovery circuit. The oil inject circuit couples to the recovery circuit by way of the oil inject hose between the high side solenoid 76 and the high side inlet 116. Disposed along the length of the oil inject hose is the oil inject valve 100. The oil inject valve 100 is preferably a solenoid actuated valve arranged in electrical communication with the controller 16 and configured to open and close when a corresponding signal from the controller 16 is received. The oil inject path follows from the oil inject bottle 114, though the oil inject solenoid 100, to the junction with the high side charge line, and to the refrigerant system 74.

To begin the process for removing the oil in the oil inject circuit, the oil inject bottle 114 is removed. With the oil inject bottle detached from the oil inject circuit, the end of the oil inject hose 112 that was connected to the oil inject bottle 114 is opened up to the air. Exposing the oil inject hose 112 to atmospheric pressure aides in permitting airflow through the hose, as will be discussed in more detail below. In addition, the oil inject solenoid 100, the high side inlet solenoid 76, and the vacuum solenoid 96 are opened. The solenoid valves are actuated by the controller 16 which operates to send communication to each of the valves to open them. With the oil inject bottle removed and the valves open, the vacuum pump 58 is turned on to generate airflow through the oil inject hose 112 and remove oil from the oil inject circuit. The pumping of the vacuum pump 58 generates enough velocity or airspeed to blow the compressor oil out of the oil inject circuit and deposit it into the waste oil drain bottle 72. The pumping continues for a length of time sufficient to flush out a desired percentage of the oil out of the oil inject circuit. The amount of time selected for running the vacuum pump may be a predetermined time such as 25 seconds that is built-in to the software program running on the refrigerant recovery cart 10 or it may any other length of time chosen to achieve the desired result. In an alternative embodiment, the vacuum pump 58 is operated for 15 seconds, then the oil inject solenoid 100 is closed to further evacuate the path between the vacuum pump 58 and the oil inject solenoid 100. The pump 58 continues, for example, 10 more seconds, then the high side inlet solenoid 76 and the vacuum solenoid 96 are closed. At this point, the vacuum pump 58 is stopped.

Once the oil is drained from the system, a new oil inject bottle 114 containing the appropriate type of oil for the next vehicle to be serviced may be installed on the refrigerant recovery unit 10. Since the oil inject hose 112 will be full of air from having operated the vacuum pump 58, a small amount of oil may be injected back into the circuit to purge the hose 112 of any air and small amounts of the old oil that may be left in the line.

If desired, the service hoses 24, 28 may optionally be flushed with refrigerant to remove oil remaining in the high side service hose 24. One such method for flushing the services hoses 24, 28 of the refrigerant recovery unit 10 is described in U.S. Ser. No. 12/248,352 incorporated herein in its entirety.

In an alternative example embodiment, a quantity of refrigerant is used to clean out the oil inject circuit. As shown in FIG. 4, the oil inject circuit may modified so that a service hose, such as the high side service hose 24, may be coupled in fluid communication with the oil inject line 112 so that refrigerant may be used to flush out any oil remaining in the oil inject circuit. The high side service hose is coupled to the end of the oil inject tube that connects to the oil inject bottle so that refrigerant may be flushed through the oil inject path from beginning to end.

With the oil bottle removed, the process for clearing oil from the oil inject circuit using refrigerant begins by opening the high side charge solenoid 98, the oil inject solenoid 100, and the recover solenoid 80. With the high side charge solenoid 98 opened, refrigerant may be transferred from the primary supply tank 12 through the high side charge solenoid 98 to the high side inlet of the refrigerant recovery unit 10, through the high side service hose 24 and into the oil inject circuit. As the refrigerant is received into the oil inject circuit, it pushes the oil through the oil inject circuit and through the refrigerant recovery circuit. When in the refrigerant recovery circuit, the refrigerant and oil cycles through the normal refrigerant recovery circuit for recovering refrigerant into the primary supply tank 12 including separating out oil into the waste oil container 72, as described above. When the operation is completed, the high side service hose 24 is disconnected from the oil inject circuit. If desired, this method may also be followed by a flushing of the refrigerant recovery unit service hoses, as previously discussed.

Example operations that may be performed by the refrigerant recovery unit 10 to flush the oil from the oil inject circuit in connection with the embodiment illustrated in FIG. 3, will next be described. As shown in FIG. 5, the software program begins at operation 200 with a prompt to a user asking if it is desired to change the oil type. If YES is selected, the program then prompts the user to remove the oil inject bottle and to press the START button, as indicated by operation 210. To initiate flushing the oil out of the oil inject lines, the controller 16 turns on the vacuum pump 58, and opens the vacuum solenoid 96, the high side inlet solenoid 76 and the oil inject solenoid 100, as indicated by operation 220. The vacuum pump is operated for a period of time, for example, 15 seconds. It is to be understood that the process is not limited to a period of 15 seconds but that any time between 2 seconds to 30 seconds is also contemplated. Any period of time sufficient clear the lines of residual oil may be used.

Once the lines are clear, the controller 16 acts to close each of the solenoids. Initially, only the oil inject solenoid 100 is closed so that the path between the vacuum pump 58 and the oil inject line may be further evacuated. With the oil inject solenoid 100 closed, the vacuum pump 58 continues to pump for some additional period of time, for example, 10 additional seconds, or until substantially all of the air is pumped out of the lines. Then, the vacuum solenoid 96 and the high side inlet solenoid 76 are closed, as indicated in operation 230. After, each of the solenoids are closed, the controller 16 stops the vacuum pump, as indicated at operation 240.

Next, the user is prompted to install the new oil inject bottle containing the new oil type, and to press START, as indicated at operation 250. With the new oil inject bottle in place, the controller 16 operates to open the oil inject solenoid 100, as indicated at operation 260. The oil inject solenoid 100 is opened for a period of time sufficient to fill the high side line with the new oil type, for example, a period of 5 seconds. With the described method, the oil inject circuit is cleared of the old oil, and the oil inject lines are filled with the new oil. However, there is still amount of the old oil remaining in the high side service hose. To clear the high side service hose, the controller 16 operates to flush refrigerant through the oil inject circuit, using the hose flush routine disclosed and described in U.S. Ser. No. 12/248,352 discussed above, as indicated at operation 270. The steps discussed herein can be automated through the use of a software program.

Figure 6:
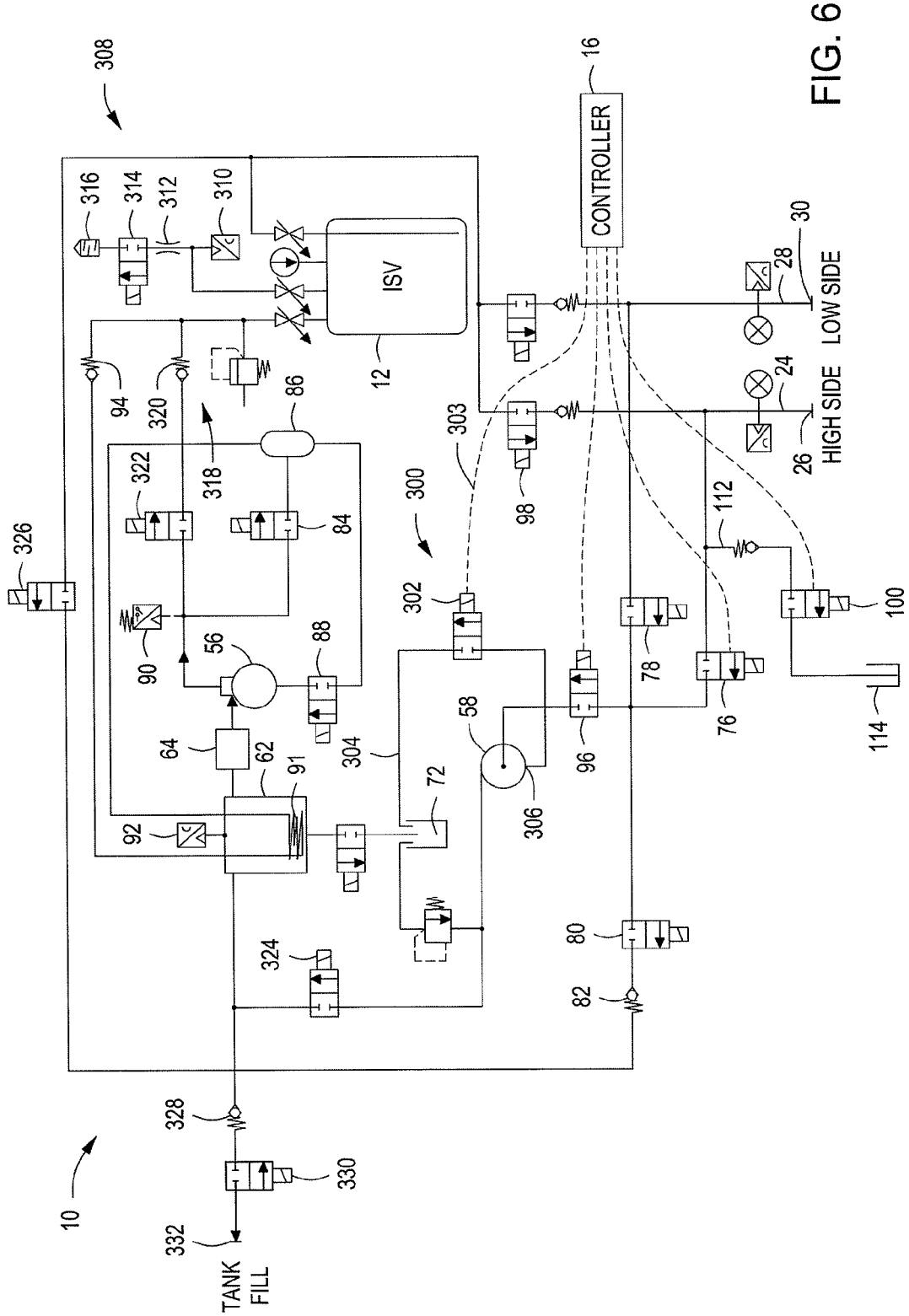
FIG. 6 is an example of a flow diagram of a refrigerant recovery unit having an automated vacuum pump oil draining apparatus.

FIG. 6 illustrates a schematic circuit diagram of the refrigerant handing or servicing equipment in accordance with some embodiments of the invention. The diagram shown in FIG. 6 is similar to those shown in FIGS. 3 and 4 and described above. Features of FIG. 6 having common reference numbers as the features shown in FIGS. 3 and 4 are substantially similar and will not be again described. Features in FIG. 6 identified by reference numbers starting with 300 (and higher numbers) are peculiar to FIG. 6 and will be described in detail below.

A vacuum pump oil drain apparatus 300 is shown in FIG. 6. The vacuum pump oil drain apparatus 300 includes a vacuum pump oil drain valve 302 that is located along a vacuum pump oil drain conduit 304 connecting a vacuum pump oil drain outlet 306 to a container 72 for containing the drained vacuum pump oil. The vacuum pump oil drain valve 302 may be an electronically activated solenoid valve 302. In other embodiments the valve 302 may be a manually activated valve 302 and manually actuated by a user. The conduit 304 may be a flexible hose or any other suitable conduit for provided fluid communication between the outlet 306 and the container 72. In some embodiments the container 72 is the used refrigerant oil drain bottle 72 already present in the refrigerant process equipment. In other embodiments, other containers 72 may be used.

In embodiments where the valve 302 is an electronically controlled valve, the valve 302 may be operatively connected to the controller 16. The connection 303 may be a wireless or wired connection. The controller 16 may be configured to allow a user to initiate a change vacuum pump oil sequence. When a user initiates a change vacuum pump oil routine, the controller 16 may check to ensure that the container 72 is not already full so that the vacuum pump oil may be drained. The controller 16 may check the status of the container by using a sensor or may determine if another routine is being run that would cause fluid to be in the container 72. If the container 72 in not available to contain vacuum pump oil, the controller may display an error message and not actuate the valve 302 to drain the vacuum pump oil. If the container 72 is available to contain the vacuum pump oil, the controller may send a signal to the valve 302 to open the valve causing the lubricating oil to drain through the conduit 304, through the valve 302 into the container 72. The valve 302 may be held open for a period of time, or in other embodiments, the valve 302 may remain open until some other action occurs such as a user imputing a command to the controller 16 to close the valve. When the vacuum pump oil is not being drained, the valve 302 is kept in the closed position.

Other features found in the embodiment shown in FIG. 6 may include an air purging apparatus 308. The air purging apparatus 308 allows the system to be purged of air. Air purged from the system may exit the main tank 12, through and orifice 312, through a purging valve 314 and through an air diffuser 316. In some embodiments the orifice may be 0.028 of an inch. A pressure transducer 310 may measure the pressure contained within the purge apparatus 308. The valve 314 may be selectively actuated to permit or not permit the purging apparatus 308 to be open to the ambient conditions.

High side clearing valves 218 may be used to clear out part of the high pressure side of the system. The high side clearing valves may include valve 322 and check valve 320. Valve 322 may be a solenoid valve. When it is desired to clear part of the high side, valve 322 is opened. Operation of the compressor 56 will force refrigerant out of part of the high pressure side through valves 322 and 320 and into the main tank 12. During this procedure the normal discharge valve 84 may be closed.

A deep recovery valve 324 is provided to assist in the deep recovery of refrigerant. When the reference from an automotive recovery system has, for the most part, entered in to the recovery unit 10 the remaining refrigerant may be extracted from the automotive recovery system by opening the deep recovery valve 324 and turning on the vacuum pump 58.

When charging a vehicle's AC system, the power charge valve 326 may be opened.

The recovery unit 10 may also be able to add refrigerant to a vehicle AC system that may be low on refrigerant. In order to obtain refrigerant from a refrigerant source, the unit 10 may include tank fill structure 332, and valves 330 and 328. The tank fill structure 332 may be configured to attach to a refrigerant source. The valve 330 may be a solenoid valve and the valve 328 may be a check valve. In other embodiments valve 330 may be a manually operated valve. When it is desired to allow refrigerant from a refrigerant source to enter the unit 10 the tank fill structure 332 is attached to the refrigerant source and the tank fill valve 330 is opened. The check valve 328 prevents refrigerant from the unit 10 from flowing out of the unit through the tank fill structure 332. When the tank fill structure 332 is not connected to a refrigerant source, the tank fill valve 330 is kept closed. The tank fill valve 330 may be connected to and controlled by the controller 16.

In some embodiments of the invention, any or all of the electronic solenoid or electrically activated valves may be connected and controlled by the controller 16.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. Refrigerant processing equipment comprising:
    a vacuum pump;
    an outlet for draining vacuum pump lubricating oil from the vacuum pump;
    a fluid container;
    a conduit configured to provide a fluid connection between the outlet and the fluid container; and
    an apparatus including a diffuser for venting air out of the refrigerant processing equipment, wherein the apparatus includes a conduit providing a pathway between a refrigerant holding tank and ambient conditions outside the refrigerant holding tank and a valve connected to the conduit configured to provide selective fluid communication between the refrigerant holding tank and the ambient conditions.

2. The refrigerant processing equipment of claim 1, further comprising:
    a valve configured to selectively permit and deny fluid access between the outlet and the fluid container.

3. The refrigerant processing equipment of claim 2, further comprising a controller and a connection that is located between the controller and the valve, the controller configured to control the operation of the valve.

4. The refrigerant processing equipment of claim 3, wherein the valve is a solenoid valve.

5. The refrigerant processing equipment of claim 3, wherein the valve is a manually operated valve.

6. The refrigerant processing equipment of claim 1, wherein the fluid container is used to contain refrigerant system oil that is separated from a refrigerant.

7. The refrigerant processing equipment of claim 1, wherein the vacuum pump, outlet, fluid container and conduit are located on a wheeled cart.

8. The refrigerant processing equipment of claim 1, wherein the pathway includes an orifice of about 0.028 inches.

9. The refrigerant processing equipment of claim 1, further comprising an air diffuser configured as part of the pathway.

10. Refrigerant processing equipment comprising:
    means for creating a vacuum;
    means for outleting a means for lubricating the means for creating a vacuum;
    means for storing a fluid;
    means for transmitting a fluid configured to provide a fluid connection between the means for outletting and the means for storing a fluid; and
    means for venting air outside the refrigerant processing equipment wherein the means for venting air includes a diffuser, wherein the means for venting includes a conduit providing a pathway between a refrigerant holding tank and ambient conditions outside the refrigerant holding tank and a valve connected to the conduit configured to provide selective fluid communication between the refrigerant holding tank and the ambient conditions.

11. The refrigerant processing equipment of claim 10, further comprising means for selectively permitting and denying fluid access between the means for outletting and the means for storing the fluid.

12. The refrigerant processing equipment of claim 11, further comprising means for controlling and means for connecting that is located between the means for controlling and the means for selectively permitting and denying fluid access, the means for controlling configured to control the operation of the means for selectively permitting and denying fluid access.

13. The refrigerant processing equipment of claim 11, wherein the means for selectively permitting and denying fluid access is a solenoid valve.

14. The refrigerant processing equipment of claim 11, wherein the means for selectively permitting and denying fluid access is a manually operated valve.

15. The refrigerant processing equipment of claim 10, wherein the means for storing the fluid is a container also used to contain refrigerant system oil that is separated from a refrigerant.

16. The refrigerant processing equipment of claim 10, further comprising means for venting air in the refrigerant processing equipment to ambient conditions.

* * * * *